US012356198B2

(12) United States Patent
Castrejon, III et al.

(10) Patent No.: US 12,356,198 B2
(45) Date of Patent: *Jul. 8, 2025

(54) SYSTEMS AND METHODS FOR DYNAMIC COMMUNICATION CHANNEL SWITCHING FOR SECURE MESSAGE PROPAGATION

(71) Applicant: BANK OF AMERICA CORPORATION, Charlotte, NC (US)

(72) Inventors: Tomas M. Castrejon, III, Fort Mill, SC (US); Manu Jacob Kurian, Dallas, TX (US); David Nardoni, Sierra Madre, CA (US); Joel Townsend, Spring Church, PA (US); Michael Robert Young, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,215

(22) Filed: May 19, 2024

(65) Prior Publication Data
US 2024/0305991 A1    Sep. 12, 2024

Related U.S. Application Data

(63) Continuation of application No. 17/699,479, filed on Mar. 21, 2022, now Pat. No. 12,035,142.

(51) Int. Cl.
*H04M 1/66* (2006.01)
*H04W 12/102* (2021.01)
(Continued)

(52) U.S. Cl.
CPC ......... *H04W 12/50* (2021.01); *H04W 12/102* (2021.01); *H04W 12/66* (2021.01); *H04W 76/15* (2018.02)

(58) Field of Classification Search
CPC ... H04W 12/102; H04W 12/50; H04W 12/66; H04W 76/15; H04W 4/08
See application file for complete search history.

(56) References Cited

U.S. PATENT DOCUMENTS 7,457,871 B2    11/2008  Barsuk
8,751,867 B2    6/2014   Marvasti et al.
(Continued)

*Primary Examiner* — Shantell L Heiber
(74) *Attorney, Agent, or Firm* — Moore & Van Allen PLLC; R. W. McCord Rayburn

(57) ABSTRACT

Systems, computer program products, and methods are described herein for dynamic communication channel switching for secure message propagation. The present invention may be configured to receive wireless signals from a plurality of devices and identify, from the plurality of devices and based on the wireless signals, a trusted device. The present invention may be configured to receive, from another device, a secure message, where the secure message includes information identifying a vulnerability in a network to which the trusted device is connected. The present invention may be configured to establish, based on receiving the secure message and using a first wireless communication interface, a communication link with a second wireless communication interface of the trusted device to establish a wireless data channel with the trusted device and transmit, via the wireless data channel, the secure message to the trusted device.

19 Claims, 2 Drawing Sheets

(51) Int. Cl.
  *H04W 12/50* (2021.01)
  *H04W 12/60* (2021.01)
  *H04W 76/15* (2018.01)

(56) References Cited

U.S. PATENT DOCUMENTS

| | | | |
|---|---|---|---|
| 9,088,541 B2 | 7/2015 | Rieke et al. |
| 9,246,935 B2 | 1/2016 | Lietz et al. |
| 9,772,898 B2 | 9/2017 | Deshpande et al. |
| 9,923,909 B2 | 3/2018 | Lietz et al. |
| 10,205,736 B2 | 2/2019 | Rieke et al. |
| 10,360,062 B2 | 7/2019 | Lietz et al. |
| 10,491,454 B2 | 11/2019 | Grigoryan et al. |
| 10,542,024 B2 | 1/2020 | Balabine et al. |
| 10,873,595 B1 | 12/2020 | Oliphant et al. |
| 10,929,363 B2 | 2/2021 | Reichert et al. |
| 11,042,320 B2 | 6/2021 | Li et al. |
| 11,089,041 B2 | 8/2021 | Balabine et al. |
| 11,115,348 B2 | 9/2021 | Sharifi Mehr |
| 11,121,914 B2 | 9/2021 | Ledbetter et al. |
| 11,176,024 B1 | 11/2021 | Fernandes De Oliveira et al. |
| 11,196,636 B2 | 12/2021 | Rieke et al. |
| 11,231,919 B2 | 1/2022 | Gonzalez |
| 11,249,750 B2 | 2/2022 | Ahuja |
| 11,303,517 B2 | 4/2022 | Grant et al. |
| 11,368,994 B1* | 6/2022 | Robinson | H04W 12/08 |
| 11,379,434 B2 | 7/2022 | Sherazi et al. |
| 11,423,253 B2 | 8/2022 | Price et al. |
| 11,461,086 B2 | 10/2022 | Livne et al. |
| 2006/0037077 A1 | 2/2006 | Gadde et al. |
| 2015/0142935 A1 | 5/2015 | Srinivas et al. |
| 2015/0304343 A1 | 10/2015 | Cabrera et al. |
| 2019/0053302 A1* | 2/2019 | Bang | H04W 76/23 |
| 2019/0116576 A1* | 4/2019 | Terävä | G01S 5/0027 |
| 2020/0257673 A1 | 8/2020 | Auer et al. |
| 2021/0044590 A1 | 2/2021 | Walker et al. |
| 2021/0067536 A1 | 3/2021 | Mylrea et al. |
| 2021/0224061 A1 | 7/2021 | Pillilli et al. |
| 2021/0377106 A1 | 12/2021 | Ledbetter et al. |
| 2021/0390187 A1 | 12/2021 | Ahmed et al. |
| 2022/0030021 A1 | 1/2022 | Balabine et al. |
| 2022/0038478 A1 | 2/2022 | Boudguiga et al. |
| 2022/0137955 A1 | 5/2022 | Aggarwal et al. |
| 2022/0179639 A1 | 6/2022 | Manley |
| 2022/0217116 A1 | 7/2022 | Schachter et al. |
| 2022/0286474 A1 | 9/2022 | Kuppa et al. |
| 2022/0321401 A1* | 10/2022 | Vuggrala | H04L 61/5007 |
| 2022/0321595 A1 | 10/2022 | Seetharaman et al. |

* cited by examiner

SYSTEMS AND METHODS FOR DYNAMIC COMMUNICATION CHANNEL SWITCHING FOR SECURE MESSAGE PROPAGATION

CROSS-REFERENCE TO RELATED APPLICATION

The present application is a continuation of and claims priority to U.S. patent application Ser. No. 17/699,479 filed on Mar. 21, 2022 and of the same title; the contents of which are also incorporated herein by reference.

FIELD OF THE INVENTION

The present invention embraces systems and methods for dynamic communication channel switching for secure message propagation.

BACKGROUND

An electronic system may be configured to communicate information and/or messages via one or more communication channels. The electronic system may be configured to communicate the information and/or messages over multiple networks, where the system is connected to the networks via wired and wireless connections.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for dynamic communication channel switching for secure message propagation. The system may include at least one communication interface including a first wireless communication interface, at least one processing device, and at least one non-transitory storage device may include computer-executable program code that, when executed by the at least one processing device, causes the at least one processing device to receive, using the at least one communication interface, wireless signals from a plurality of devices and identify, from the plurality of devices and based on the wireless signals, a trusted device, where the trusted device includes a second wireless communication interface. The at least one non-transitory storage device may include computer-executable program code that, when executed by the at least one processing device, causes the at least one processing device to receive, from another device, a secure message, where the secure message includes information identifying a vulnerability in a network to which the trusted device is connected. The at least one non-transitory storage device may include computer-executable program code that, when executed by the at least one processing device, causes the at least one processing device to establish, based on receiving the secure message and using the first wireless communication interface, a communication link with the second wireless communication interface of the trusted device to establish a wireless data channel with the trusted device and transmit, via the wireless data channel, the secure message to the trusted device.

In some embodiments, the at least one non-transitory storage device may include computer-executable program code that, when executed by the at least one processing device, causes the at least one processing device to, when receiving the secure message, receive the secure message with the first wireless communication interface.

In some embodiments, the at least one non-transitory storage device may include computer-executable program code that, when executed by the at least one processing device, causes the at least one processing device to, before receiving the secure message, receive, from the other device, an instruction to activate the first wireless communication interface. Additionally, or alternatively, the at least one non-transitory storage device may include computer-executable program code that, when executed by the at least one processing device, causes the at least one processing device to, before receiving the secure message and based on receiving the instruction, activate the first wireless communication interface. In some embodiments, the at least one non-transitory storage device may include computer-executable program code that, when executed by the at least one processing device, causes the at least one processing device to, before receiving the secure message and after activating the first wireless communication interface, establish, using the first wireless communication interface, another communication link with the other device to establish another wireless data channel with the other device. Additionally, or alternatively, the at least one non-transitory storage device may include computer-executable program code that, when executed by the at least one processing device, causes the at least one processing device to, when receiving the secure message, receive the secure message via the other wireless data channel.

In some embodiments, the at least one non-transitory storage device may include computer-executable program code that, when executed by the at least one processing device, causes the at least one processing device to activate, based on receiving the secure message, the first wireless communication interface.

In some embodiments, the at least one non-transitory storage device may include computer-executable program code that, when executed by the at least one processing device, causes the at least one processing device to, before establishing the communication link with the second wireless communication interface, provide, to the trusted device, an instruction to activate the second wireless communication interface.

In some embodiments, the at least one non-transitory storage device may include computer-executable program code that, when executed by the at least one processing device, causes the at least one processing device to identify, from the plurality of devices, multiple trusted devices including wireless communication interfaces, where each trusted device of the multiple trusted devices includes another wireless communication interface of the wireless communication interfaces, establish, based on receiving the secure message and using the first wireless communication interface, communication links with the other wireless communication interfaces to establish wireless data channels with the multiple trusted devices, and transmit, via the wireless data channels, the secure message to the multiple trusted devices.

In some embodiments, the at least one non-transitory storage device may include computer-executable program code that, when executed by the at least one processing device, causes the at least one processing device to identify, from the plurality of devices and based on the wireless signals, another trusted device and transmit, based on receiving the secure message, the secure message to the other trusted device via multiple networks by transmitting different portions of the secure message via each network of the multiple networks.

In some embodiments, the communication link may be a direct communication link, and the at least one non-transitory storage device may include computer-executable program code that, when executed by the at least one processing device, causes the at least one processing device to, when transmitting the secure message to the trusted device, transmit the secure message directly to the trusted device.

In some embodiments, each of the first wireless communication interface and the second wireless communication interface may include a short-range wireless communication interface.

In some embodiments, each of the first wireless communication interface and the second wireless communication interface may include a Bluetooth wireless communication interface.

In some embodiments, each of the first wireless communication interface and the second wireless communication interface may include a Wi-Fi wireless communication interface having device-to-device direct connection capability.

In some embodiments, the at least one non-transitory storage device may include computer-executable program code that, when executed by the at least one processing device, causes the at least one processing device to, based on receiving the secure message, disconnect from the network identified by the information as having the vulnerability.

In some embodiments, the at least one non-transitory storage device may include computer-executable program code that, when executed by the at least one processing device, causes the at least one processing device to, based on receiving the secure message, refrain from connecting to the network identified by the information as having the vulnerability. Additionally, or alternatively, the at least one non-transitory storage device may include computer-executable program code that, when executed by the at least one processing device, causes the at least one processing device to, after receiving the secure message, receive another secure message, where the other secure message includes additional information identifying that the vulnerability in the network has been resolved, and establish, based on receiving the other secure message, a connection to the network.

In another aspect, the present invention embraces a computer program product for dynamic communication channel switching for secure message propagation. The computer program product may include a non-transitory computer-readable medium including code that, when executed by a first apparatus, causes the first apparatus to receive, using at least one communication interface of the first apparatus, wireless signals from a plurality of devices, where the at least one communication interface of the first apparatus includes a first wireless communication interface and identify, from the plurality of devices and based on the wireless signals, a trusted device, where the trusted device includes a second wireless communication interface. The computer program product may include a non-transitory computer-readable medium including code that, when executed by a first apparatus, causes the first apparatus to receive, from another device, a secure message, where the secure message includes information identifying a vulnerability in a network to which the trusted device is connected. The computer program product may include a non-transitory computer-readable medium including code that, when executed by a first apparatus, causes the first apparatus to establish, based on receiving the secure message and using the first wireless communication interface, a communication link with the second wireless communication interface of the trusted device to establish a wireless data channel with the trusted device and transmit, via the wireless data channel, the secure message to the trusted device.

In some embodiments, the computer program product may include a non-transitory computer-readable medium including code that, when executed by a first apparatus, causes the first apparatus to, when receiving the secure message, receive the secure message with the first wireless communication interface.

In yet another aspect, a method for dynamic communication channel switching for secure message propagation is presented. The method may include receiving, using at least one communication interface of a first device, wireless signals from a plurality of devices, where the at least one communication interface of the first device includes a first wireless communication interface and identifying, from the plurality of devices and based on the wireless signals, a trusted device, where the trusted device includes a second wireless communication interface. The method may include receiving, from another device, a secure message, where the secure message includes information identifying a vulnerability in a network to which the trusted device is connected. The method may include establishing, based on receiving the secure message and using the first wireless communication interface, a communication link with the second wireless communication interface of the trusted device to establish a wireless data channel with the trusted device and transmitting, via the wireless data channel, the secure message to the trusted device.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
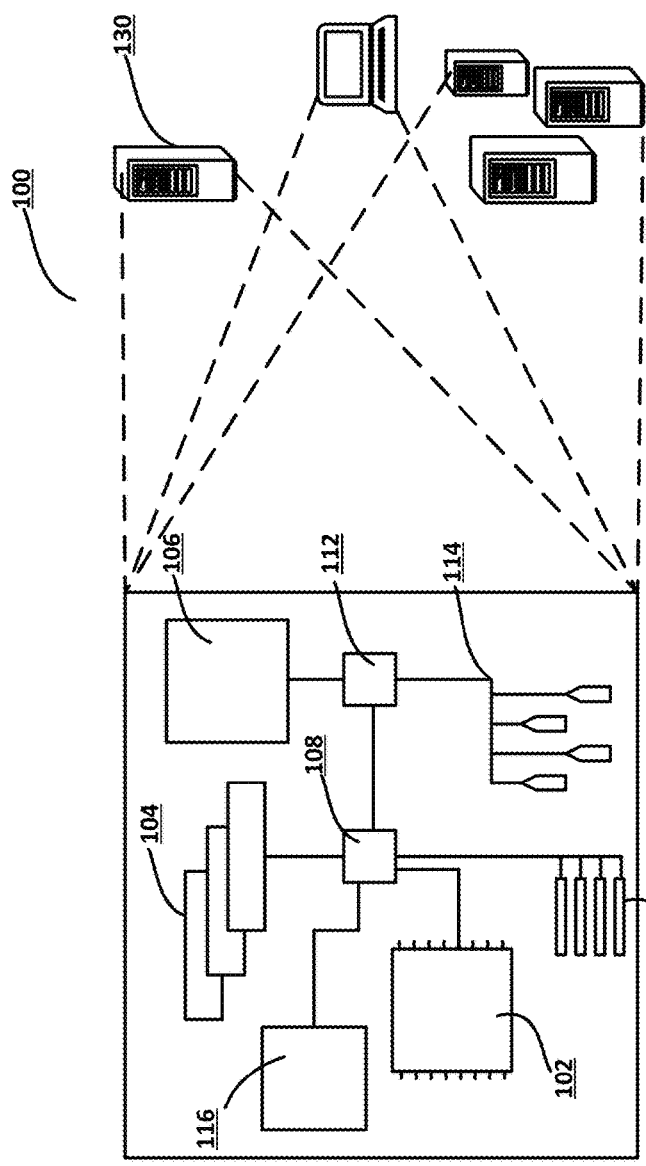
Figure 1:
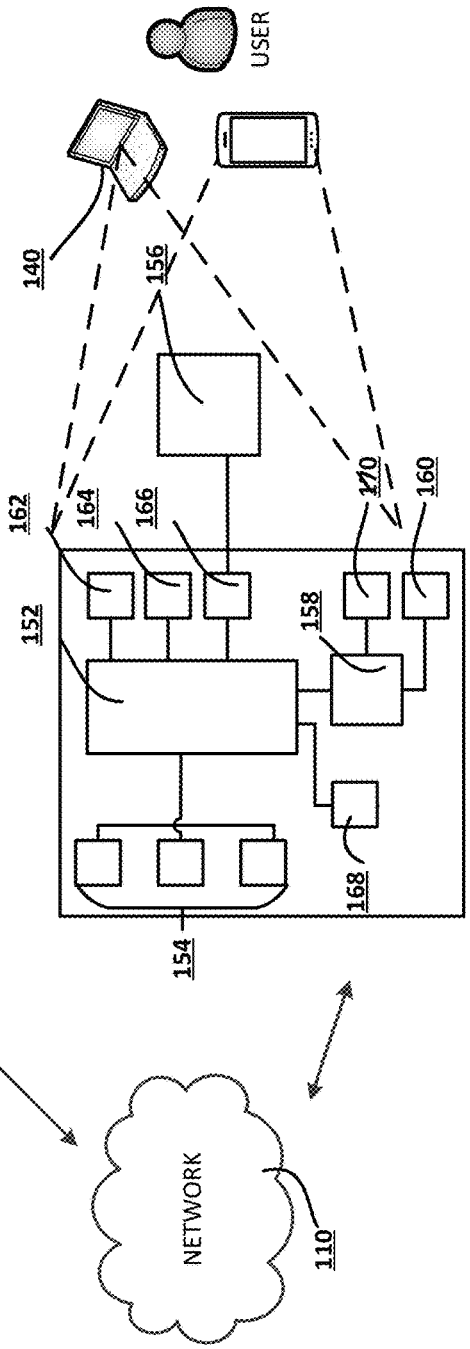
Figure 2:
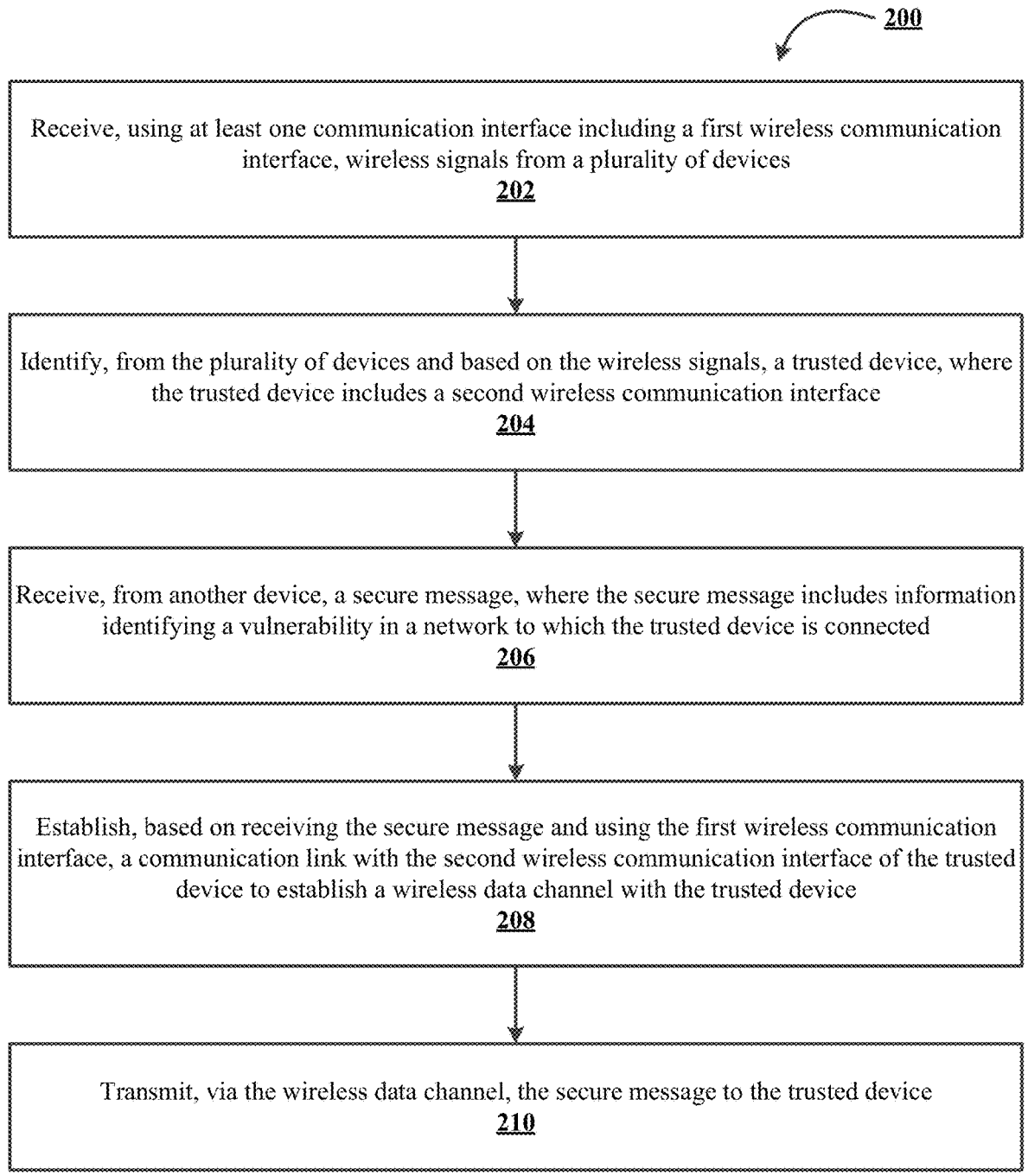

Having thus described embodiments of the invention in general terms, reference will now be made the accompanying drawings, wherein:

FIG. 1 illustrates technical components of a system for dynamic communication channel switching for secure message propagation, in accordance with an embodiment of the invention; and FIG. 2 illustrates a process flow for dynamic communication channel switching for secure message propagation, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, an electronic system may be configured to communicate information and/or messages via one or more communication channels. The electronic system may be configured to communicate the information and/or messages over multiple networks, where the system is connected to the networks via wired and wireless connections. However, the networks and/or the connections may become compromised, vulnerable, subject to misappropriation of information, and/or the like. Additionally, one or more libraries accessed by the electronic system via the networks and/or the connections may become compromised, vulnerable, subject to misappropriation of information, and/or the like. In such scenarios, the electronic system may not be able to securely receive and/or transmit information and/or messages regarding the vulnerability due to the compromised libraries, networks, and/or connections. When the electronic system cannot securely receive and/or transmit information and/or messages, the likelihood of misappropriation of the information and/or messages increases. Such misappropriation and efforts required to identify, correct, repair, report, and/or the like such misappropriation consumes significant computing resources, network resources, and financial resources.

Some embodiments described herein provide a system, a computer program product, and/or a method for dynamic communication channel switching for secure message propagation. For example, a system (e.g., an electronic system for dynamic communication channel switching for secure message propagation and/or the like) may be configured to activate an alternate communication channel between devices when there is a need to communicate secure messaging, such as a notification of network, connection, and/or library vulnerabilities. For example, a remote device (e.g., in a rural geographic location and/or the like) may not have a wired communication channel that is capable of receiving secure messaging. In such an example, the system may identify whether the device is connected to other devices with a wired communication channel and use channel switching capabilities. Such a connection may include a Bluetooth connection, an internet-of-things-type connection, a Wi-Fi connection, and/or the like. In such an example, the communication channel may switch from a wired connection requirement to a wireless connection and/or may jump from one network to another to deliver the secure message. Such a channel may otherwise be dormant and may be activated only to transmit the secure message. In some embodiments, the system may establish a circle of trust between certain devices, thereby allowing for dynamic switching of communication channels and in some cases, switching between trusted networks.

In some embodiments, the system (e.g., an electronic system for dynamic communication channel switching for secure message propagation and/or the like) may include one or more communication interfaces including a wireless communication interface, and the system be configured to receive, using the at least one communication interface, wireless signals from a plurality of devices and identify, from the plurality of devices and based on the wireless signals, a trusted device (e.g., also including a wireless communication interface). For example, the system, the trusted device, and/or other trusted devices may receive information (e.g., from a known system) identifying each other as trusted devices, where the information permits the devices to identify each other based on wireless signals. As another example, the system, the trusted device, and/or other trusted devices may receive and/or may have stored (e.g., before deployment, during manufacture, during provisioning, and/or the like) tokens, unique identifiers, a hash, a protocol, and/or an algorithm that permits the devices to identify each other (e.g., based on wireless signals, wireless exchange of data, and/or the like).

In some embodiments, the system may be configured to receive, from another device, a secure message. For example, the secure message may include information identifying a vulnerability in a network to which the trusted device is connected. Additionally, or alternatively, the other device may be another trusted device, a secure server, a secure system, a known server, a known system, and/or the like. In some embodiments, the system may receive the secure message via a secure wired communication channel. Additionally, or alternatively, the system may receive the secure message via a secure wireless communication channel. In some embodiments, the system may receive the secure message in portions transmitted over multiple networks (e.g., via wired connections, wireless connections, and/or the like).

In some embodiments, the system may be configured to establish, based on receiving the secure message and using the first wireless communication interface, a communication link with the second wireless communication interface of the trusted device to establish a wireless data channel with the trusted device. For example, the system may establish a direct, short-range, Bluetooth, Wi-Fi, internet-of-things-type, wireless, and/or the like connection with the trusted device. Additionally, or alternatively, the system may be configured to transmit, via the wireless data channel, the secure message to the trusted device.

In some embodiments, the system and/or the trusted device may include a communication module (e.g., a direct, short-range, Bluetooth, Wi-Fi, internet-of-things-type, wireless, and/or the like communication module) installed on an operating-system level, where the communication module is configured to identify other trusted devices, receive information and/or messages from other trusted devices, transmit information and/or messages to other trusted devices, and/or the like. By including the communication module at the operating-system level, the communication module may operate as a back channel for communication with other trusted devices that bypasses potentially compromised software running on the system and/or trusted devices.

In this way, the system and/or the trusted devices may be able to securely receive and/or transmit information and/or messages regarding a vulnerability despite compromised libraries, networks, and/or connections. By being able to still securely receive and/or transmit information and/or messages, the system and/or the trusted devices reduce the likelihood of misappropriation of the information and/or messages. Furthermore, by reducing the likelihood of misappropriation of the information and/or messages, such systems and/or trusted devices conserve the computing resources, the network resources, and the financial resources that would otherwise be consumed by misappropriation and efforts required to identify, correct, repair, report, and/or the like such misappropriation.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to computing resources, computing services, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, provision of computing resources, provision of computing services, a payment, processing of funds, purchase of goods or services, a return of goods or services, a payment transaction, a credit transaction, other interactions involving a user's resource or account, and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component.

In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for dynamic communication channel switching for secure message propagation within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile computing device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some embodiments, the system 130 and the user input system 140 may be used to implement processes described herein, including user-side and server-side processes for dynamic communication channel switching for secure message propagation, in accordance with an embodiment of the present invention. The system 130 may represent various forms of digital computers, such as laptops, desktops, workstations, personal digital assistants, servers, blade servers, mainframes, automated teller machines, and/or the like. The user input system 140 may represent various forms of devices, such as personal digital assistants, cellular telephones, smartphones, smart glasses, desktops, workstations, automated teller machines, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In some embodiments, the memory 104 may be a volatile memory unit or units, such as volatile random-access memory (RAM) having a cache area for the temporary storage of information. In some embodiments, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more systems, one or more devices, one or more trusted devices, and/or the like (e.g., one or more of which may be similar to the system 130 and/or the user input system 140) associated with one or more entities (e.g., businesses, merchants, financial institutions, card management institutions, software and/or hardware development companies, software and/or hardware testing companies, and/or the like). In some embodiments, the one or more systems, the one or more devices, the one or more trusted devices, and/or the like may perform one or more of the steps described herein with respect to the process flow described herein with respect to FIG. 2.

FIG. 2 illustrates a process flow 200 for dynamic communication channel switching for secure message propagation, in accordance with an embodiment of the invention. In some embodiments, one or more systems, one or more devices, one or more trusted devices, and/or the like (e.g., similar to one or more of the systems described herein with respect to FIG. 1) may perform one or more of the steps of process flow 200.

A shown in block 202, the process flow 200 may include receiving, using at least one communication interface including a first wireless communication interface, wireless signals from a plurality of devices. For example, a system may use a wireless communication interface to scan for and/or receive wireless signals from one or more devices (e.g., within wireless transmission range of the system and/or the like).

As shown in block 204, the process flow 200 may include identifying, from the plurality of devices and based on the wireless signals, a trusted device, where the trusted device includes a second wireless communication interface. For example, the system may identify the trusted device from the plurality of devices based on a type of wireless signal (e.g., a frequency, a bandwidth, and/or the like) being transmitted by the trusted device and/or data stored on the system identifying the trusted device, characteristics of the trusted device, data exchanged between the system and the trusted device, and/or the like.

As shown in block 206, the process flow 200 may include receiving, from another device, a secure message, where the secure message includes information identifying a vulnerability in a network to which the trusted device is connected. For example, an entity system and/or the like may provide the secure message to the system based on identifying and/or receiving information identifying the vulnerability in the network.

As shown in block 208, the process flow 200 may include establishing, based on receiving the secure message and using the first wireless communication interface, a communication link with the second wireless communication interface of the trusted device to establish a wireless data channel with the trusted device. For example, the system may use the first wireless communication interface to establish a short-range, direct wireless connection to the trusted device such that the system and the trusted device may communicate directly with each other without communications passing through a network, another device (e.g., a router, a system, and/or the like), another system, and/or the like.

As shown in block 210, the process flow 200 may include transmitting, via the wireless data channel, the secure message to the trusted device. For example, the system may transmit data including information identifying the vulnerability in the network to the trusted device. In some embodiments, the system may transmit, to the trusted device, instructions that cause the trusted device to disconnect from the network.

Process flow 200 may include additional embodiments, such as any single embodiment or any combination of embodiments described below and/or in connection with one or more other processes described elsewhere herein.

In a first embodiment, the process flow 200 may include, when receiving the secure message, receiving the secure message with the first wireless communication interface.

In a second embodiment alone or in combination with the first embodiment, the process flow 200 may include, before receiving the secure message, receiving, from the other device, an instruction to activate the first wireless communication interface In a third embodiment alone or in combination with any of the first through second embodiments, the process flow 200 may include, before receiving the secure message and based on receiving the instruction, activating the first wireless communication interface.

In a fourth embodiment alone or in combination with any of the first through third embodiments, the process flow 200 may include, before receiving the secure message and after activating the first wireless communication interface, establishing, using the first wireless communication interface, another communication link with the other device to establish another wireless data channel with the other device.

In a fifth embodiment alone or in combination with any of the first through fourth embodiments, the process flow 200 may include, when receiving the secure message, receiving the secure message via the other wireless data channel.

In a sixth embodiment alone or in combination with any of the first through fifth embodiments, the process flow 200 may include activating, based on receiving the secure message, the first wireless communication interface.

In a seventh embodiment alone or in combination with any of the first through sixth embodiments, the process flow 200 may include, before establishing the communication link with the second wireless communication interface, providing, to the trusted device, an instruction to activate the second wireless communication interface.

In an eighth embodiment alone or in combination with any of the first through seventh embodiments, the process flow 200 may include identifying, from the plurality of devices, multiple trusted devices including wireless communication interfaces, where each trusted device of the multiple trusted devices includes another wireless communication interface of the wireless communication interfaces, establishing, based on receiving the secure message and using the first wireless communication interface, communication links with the other wireless communication interfaces to establish wireless data channels with the multiple trusted devices, and transmitting, via the wireless data channels, the secure message to the multiple trusted devices.

In a ninth embodiment alone or in combination with any of the first through eighth embodiments, the process flow 200 may include identifying, from the plurality of devices and based on the wireless signals, another trusted device and transmitting, based on receiving the secure message, the secure message to the other trusted device via multiple networks by transmitting different portions of the secure message via each network of the multiple networks.

In a tenth embodiment alone or in combination with any of the first through ninth embodiments, the process flow 200 may include when transmitting the secure message to the trusted device, transmitting the secure message directly to the trusted device.

In an eleventh embodiment alone or in combination with any of the first through tenth embodiments, the first wireless communication interface and/or the second wireless communication interface may include a short-range wireless communication interface.

In a twelfth embodiment alone or in combination with any of the first through eleventh embodiments, the first wireless communication interface and/or the second wireless communication interface may include a Bluetooth wireless communication interface.

In a thirteenth embodiment alone or in combination with any of the first through twelfth embodiments, the first wireless communication interface and/or the second wireless communication interface may include a Wi-Fi wireless communication interface having device-to-device direct connection capability.

In a fourteenth embodiment alone or in combination with any of the first through thirteenth embodiments, the process flow 200 may include, based on receiving the secure message, disconnecting from the network identified by the information as having the vulnerability.

In a fifteenth embodiment alone or in combination with any of the first through fourteenth embodiments, the process flow 200 may include, based on receiving the secure message, refraining from connecting to the network identified by the information as having the vulnerability.

In a sixteenth embodiment alone or in combination with any of the first through fifteenth embodiments, the process flow 200 may include, after receiving the secure message, receiving another secure message, where the other secure message includes additional information identifying that the vulnerability in the network has been resolved and establishing, based on receiving the other secure message, a connection to the network.

Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for dynamic communication channel switching for secure message propagation, the system comprising:
   at least one communication interface comprising a first wireless communication interface;
   at least one processing device;
   at least one non-transitory storage device comprising computer-executable program code that, when executed by the at least one processing device, causes the at least one processing device to:
      receive, using the at least one communication interface, wireless signals from a plurality of devices;
      identify, from the plurality of devices and based on the wireless signals, a trusted device, wherein the trusted device comprises a second wireless communication interface;
      receive, from another device, a secure message, wherein the secure message comprises information identifying a vulnerability in a network to which the trusted device is connected;
      establish, based on receiving the secure message and using the first wireless communication interface, a communication link with the second wireless communication interface of the trusted device to establish a wireless data channel with the trusted device;
      transmit, via the wireless data channel, the secure message to the trusted device;
      identify, from the plurality of devices and based on the wireless signals, another trusted device; and
      transmit, based on receiving the secure message, the secure message to the other trusted device via multiple networks by transmitting different portions of the secure message via each network of the multiple networks.

2. The system of claim 1, wherein the at least one non-transitory storage device comprises computer-executable program code that, when executed by the at least one processing device, causes the at least one processing device to, when receiving the secure message, receive the secure message with the first wireless communication interface.

3. The system of claim 1, wherein the at least one non-transitory storage device comprises computer-executable program code that, when executed by the at least one processing device, causes the at least one processing device to, before receiving the secure message, receive, from the other device, an instruction to activate the first wireless communication interface.

4. The system of claim 3, wherein the at least one non-transitory storage device comprises computer-executable program code that, when executed by the at least one processing device, causes the at least one processing device to, before receiving the secure message and based on receiving the instruction, activate the first wireless communication interface.

5. The system of claim 4, wherein the at least one non-transitory storage device comprises computer-executable program code that, when executed by the at least one processing device, causes the at least one processing device to, before receiving the secure message and after activating the first wireless communication interface, establish, using the first wireless communication interface, another communication link with the other device to establish another wireless data channel with the other device.

6. The system of claim 5, wherein the at least one non-transitory storage device comprises computer-executable program code that, when executed by the at least one processing device, causes the at least one processing device to, when receiving the secure message, receive the secure message via the other wireless data channel.

7. The system of claim 1, wherein the at least one non-transitory storage device comprises computer-executable program code that, when executed by the at least one processing device, causes the at least one processing device to activate, based on receiving the secure message, the first wireless communication interface.

8. The system of claim 1, wherein the at least one non-transitory storage device comprises computer-executable program code that, when executed by the at least one processing device, causes the at least one processing device to, before establishing the communication link with the second wireless communication interface, provide, to the trusted device, an instruction to activate the second wireless communication interface.

9. The system of claim 1, wherein the at least one non-transitory storage device comprises computer-executable program code that, when executed by the at least one processing device, causes the at least one processing device to:
identify, from the plurality of devices, multiple trusted devices comprising wireless communication interfaces, wherein each trusted device of the multiple trusted devices comprises another wireless communication interface of the wireless communication interfaces;
establish, based on receiving the secure message and using the first wireless communication interface, communication links with the other wireless communication interfaces to establish wireless data channels with the multiple trusted devices; and
transmit, via the wireless data channels, the secure message to the multiple trusted devices.

10. The system of claim 1, wherein the communication link is a direct communication link, and wherein the at least one non-transitory storage device comprises computer-executable program code that, when executed by the at least one processing device, causes the at least one processing device to, when transmitting the secure message to the trusted device, transmit the secure message directly to the trusted device.

11. The system of claim 1, wherein each of the first wireless communication interface and the second wireless communication interface comprises a short-range wireless communication interface.

12. The system of claim 1, wherein each of the first wireless communication interface and the second wireless communication interface comprises a Bluetooth wireless communication interface.

13. The system of claim 1, wherein each of the first wireless communication interface and the second wireless communication interface comprises a Wi-Fi wireless communication interface having device-to-device direct connection capability.

14. The system of claim 1, wherein the at least one non-transitory storage device comprises computer-executable program code that, when executed by the at least one processing device, causes the at least one processing device to, based on receiving the secure message, disconnect from the network identified by the information as having the vulnerability.

15. The system of claim 1, wherein the at least one non-transitory storage device comprises computer-executable program code that, when executed by the at least one processing device, causes the at least one processing device to, based on receiving the secure message, refrain from connecting to the network identified by the information as having the vulnerability.

16. The system of claim 15, wherein the at least one non-transitory storage device comprises computer-executable program code that, when executed by the at least one processing device, causes the at least one processing device to, after receiving the secure message:
receive another secure message, wherein the other secure message comprises additional information identifying that the vulnerability in the network has been resolved; and
establish, based on receiving the other secure message, a connection to the network.

17. A computer program product for dynamic communication channel switching for secure message propagation, the computer program product comprising a non-transitory computer-readable medium comprising code that, when executed by a first apparatus, causes the first apparatus to:
receive, using at least one communication interface of the first apparatus, wireless signals from a plurality of devices, wherein the at least one communication interface of the first apparatus comprises a first wireless communication interface;
identify, from the plurality of devices and based on the wireless signals, a trusted device, wherein the trusted device comprises a second wireless communication interface;
receive, from another device, a secure message, wherein the secure message comprises information identifying a vulnerability in a network to which the trusted device is connected;
establish, based on receiving the secure message and using the first wireless communication interface, a communication link with the second wireless communication interface of the trusted device to establish a wireless data channel with the trusted device;
transmit, via the wireless data channel, the secure message to the trusted device;
identify, from the plurality of devices and based on the wireless signals, another trusted device; and
transmit, based on receiving the secure message, the secure message to the other trusted device via multiple networks by transmitting different portions of the secure message via each network of the multiple networks.

18. The computer program product of claim 17, wherein the non-transitory computer-readable medium comprises code that, when executed by the first apparatus, causes the first apparatus to, when receiving the secure message, receive the secure message with the first wireless communication interface.

19. A method for dynamic communication channel switching for secure message propagation, the method comprising:

receiving, using at least one communication interface of a first device, wireless signals from a plurality of devices, wherein the at least one communication interface of the first device comprises a first wireless communication interface;

identifying, from the plurality of devices and based on the wireless signals, a trusted device, wherein the trusted device comprises a second wireless communication interface;

receiving, from another device, a secure message, wherein the secure message comprises information identifying a vulnerability in a network to which the trusted device is connected;

establishing, based on receiving the secure message and using the first wireless communication interface, a communication link with the second wireless communication interface of the trusted device to establish a wireless data channel with the trusted device;

transmitting, via the wireless data channel, the secure message to the trusted device;

identifying, from the plurality of devices and based on the wireless signals, another trusted device; and transmitting, based on receiving the secure message, the secure message to the other trusted device via multiple networks by transmitting different portions of the secure message via each network of the multiple networks.

* * * * *